Sept. 7, 1937. E. A. JOHNSTON 2,092,607
SEMICRAWLER TRACTOR
Filed Dec. 3, 1934 8 Sheets-Sheet 2

Sept. 7, 1937.　　　　E. A. JOHNSTON　　　　2,092,607
SEMICRAWLER TRACTOR
Filed Dec. 3, 1934　　　　8 Sheets-Sheet 7

Inventor
Edward A. Johnston
By V. F. Lassague
Atty.

Sept. 7, 1937.  E. A. JOHNSTON  2,092,607
SEMICRAWLER TRACTOR
Filed Dec. 3, 1934   8 Sheets—Sheet 8

Inventor
Edward A. Johnston
By V. F. Lardagne
Att'y

Patented Sept. 7, 1937

2,092,607

UNITED STATES PATENT OFFICE 2,092,607

SEMICRAWLER TRACTOR

Edward A. Johnston, Chicago, Ill., assignor to International Harvester Company, a corporation of New Jersey Application December 3, 1934, Serial No. 755,699

20 Claims. (Cl. 180—9.2)

The invention relates to improved traction increasing attachments serving as substitutes for the traction wheels of a tractor, especially of the type shown in my Patent 1,559,617 issued November 3, 1925, for a tractor. More particularly, the invention provides track belt substitutes for the traction wheels, said track belts converting the tractor into a semi-crawler. Further, the crawler attachment for each side of the tractor includes a special spade lug driving wheel to increase the tractive effort of the crawler attachment.

In some conditions of use, wheel tractors, because of slippage of the traction driving wheels, do not afford adequate traction and the maximum drawbar pull of the tractor is not made available. Semi-crawlers substituted for the drive wheels increase the traction to a large extent and also distribute the weight of the tractor to prevent ground packing. Under some conditions the crawler substitutes will also slip and cause loss of traction. It is, therefore, also desirable to provide an additional attachment in the form of an enlarged special driving wheel for the crawler units, the special driving wheel attachment affording the maximum tractive effort under practically all conditions of use without losing the advantage gained by not packing the soil.

Accordingly, it is an object of the invention to provide an improved semi-crawler tractor.

Another object is to provide an improved semi-crawler attachment which can be used in place of the driving wheels of a wheel tractor.

It is also an important object to provide a special driving wheel attachment for each crawler unit to increase the tractive effort of the tractor to a maximum.

Further, it is an object to provide improved differential steering and driving control means for these traction increasing attachments.

Still another object of the invention is to make each attachment easily mountable and demountable with respect to the body of the tractor.

Other objects are generally to improve crawler attachments of this type; to make them simple and inexpensive, and fool-proof in operation.

These important objects are achieved by providing special housing attachments adapted to be connected to the respective sides of the tractor body after the driving wheels have been removed. These housings include differential shafts, the inner ends of which are slidable into the final drive differential unit of the tractor for operative connection therewith, said housings also including dual drive connections for driving a counter-shaft and sleeve assembly to impart uniform linear peripheral speeds of rotation to a track driving wheel and the special spade lug driving wheel attachment for the crawler track. Each housing includes a brake for controlling steering movements. This structure is specifically disclosed in the accompanying sheets of drawings wherein is illustrated one practicable form which the invention may assume. In these drawings,—

As in the prior patent mentioned, the tractor comprises a main frame, or body, 20 preferably formed as an integral casting supported at its front end by the steering wheels 21. The rear end of the tractor, before it was converted to a semi-crawler, was supported on a pair of traction wheels, as shown in the patent mentioned, but, in the present disclosure, such rear end is supported on the crawler units later to be described.

The front end of said body 20 carries a radiator 22, engine 23, and fuel tank 24. A pulley 25 extends from a gear box 26 located under the fuel tank 24. The frame 20, rearwardly of the pulley box 26, carries the usual change speed gear unit 27 in the cap of which is mounted a steering shaft 28 having connection with a lever 29 to operate a link 30 for steering the front wheels 21 in the usual way. Adjacent the steering shaft 28 is a gear shaft lever 31 and, in proximity thereto, the body 20 carries at its rear a driver's seat 32.

As in applicant's previous patent heretofore identified, the motor 23, through an engine clutch not shown, drives a sliding speed change gear set, also not herein shown, but located in the body 20 under the box 27. However, the final power output shaft of the change speed gear unit is shown at 33 in Figures 5 and 6, said shaft projecting longitudinally rearwardly and carrying at its rear end a small bevel pinion 34 meshing with a much larger bevel gear 35 keyed to a cross counter-shaft 36 journaled in the body 20 of the tractor. Said shaft 36 carries and drives a small spur gear 37.

Figure 7:
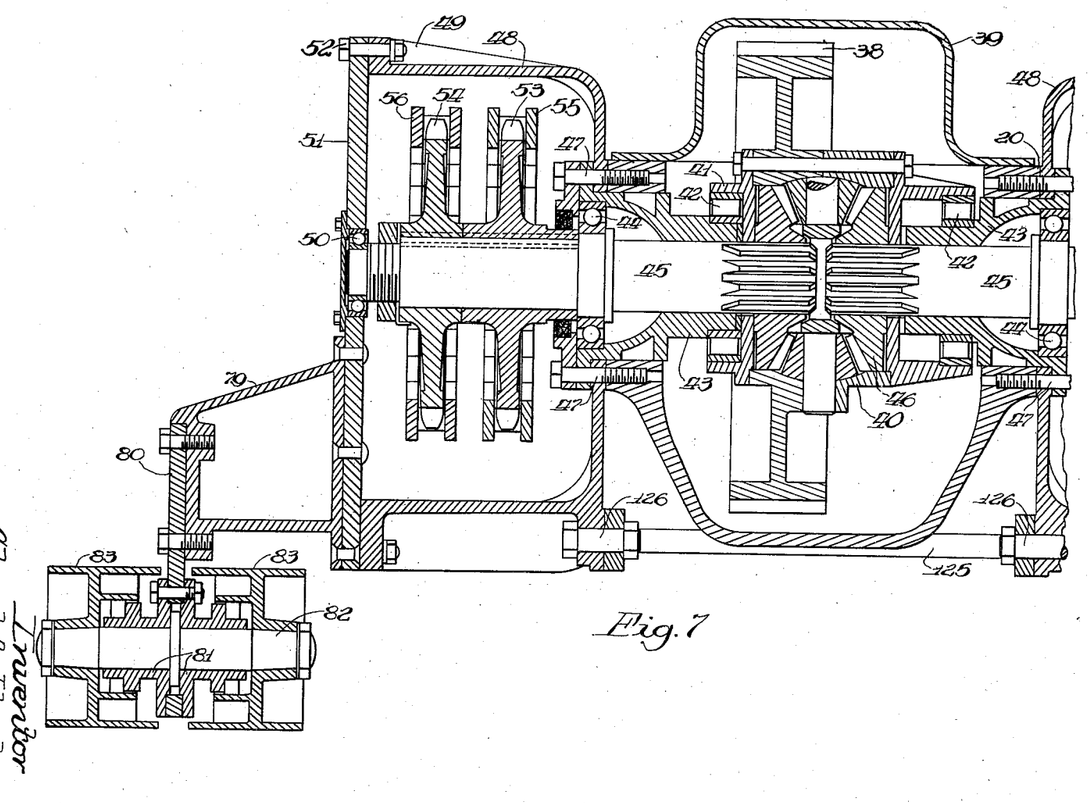
Figure 7 is a transverse sectional view through the differential drive assembly, taken along the line 7—7 of Figure 3, looking in the direction of the arrows.

This spur gear 37 meshes with and drives a large differential bull gear 38 located in the rear part of the body 20. As shown best in Figure 7, the body at this point is closed by a cover 39, all as described in the previous patent. The gear 38 is secured to and turns a conventional differential drum 40, having oppositely extending, transverse trunnions 41, turnable on bearings 42 located on and around axle carrier collars 43, which latter are carried in the sides of the body 20. The collars carry bearings 44 for journaling differential jack shafts 45, which in the usual way have their inner ends splined to be slipped into a conventional differential gear set 46 associated with the drum 40 in the usual manner. These jack shafts 45 are substituted for the differential jack shafts used in the wheel tractor of the prior patent, which shafts of the patent carried and served to drive differentially the rear or traction wheels of the wheel tractor. As shown in Figure 7, the carriers 43 are secured to the body 20 by cap screws 47.

Figure 2:
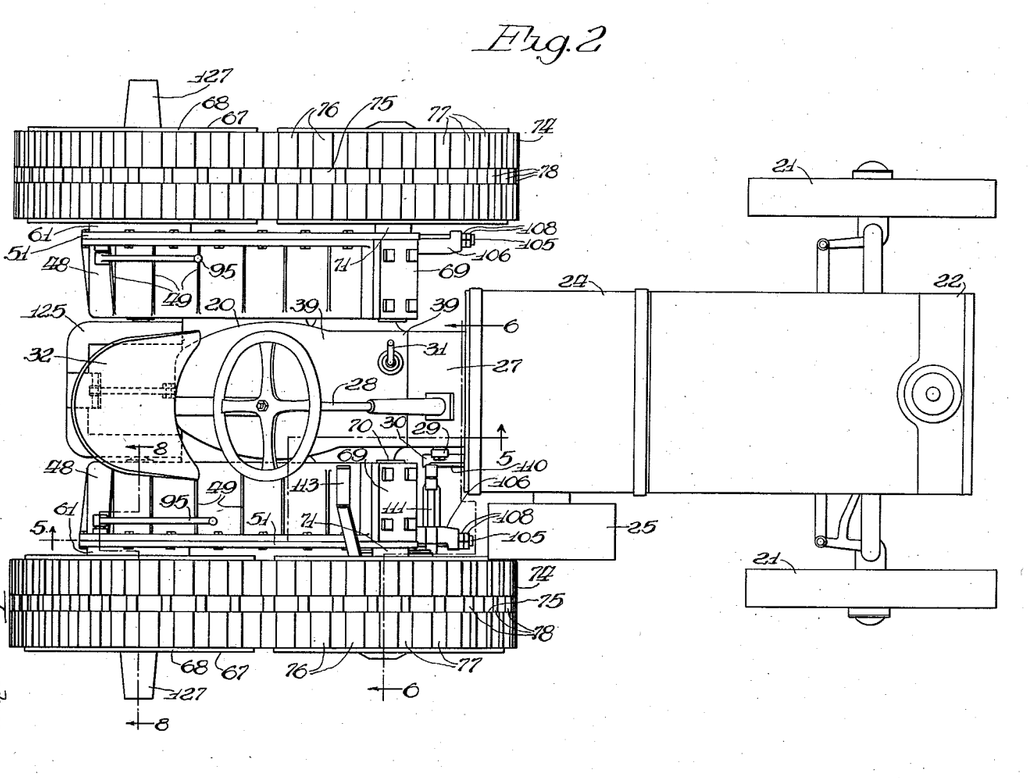
Figure 2 is a general plan view of the tractor as shown in Figure 1.

These screws 47 serve also to fasten side housings 48 intermediately of their ends to the sides of the tractor body adjacent the openings therein, which receive the axle carriers 43. These side housings are relatively shallow, but rather long, the same extending longitudinally parallel with the sides of the body 20. The rear end of each housing 48 extends some distance rearwardly of the rear end of the body 20, as shown in Figure 2, while the forward ends of said housings 48 extend forwardly to a point just rearwardly of the pulley 25. These housings are preferably cast and formed with transverse strengthening ribs 49.

The outer ends of the respective differential jack shafts 45 project through these housings 48 about midway of their front and rear ends, said shafts being journaled in bearings 50 carried in cover plates 51 secured by bolts 52 to the housings 48 to close their open outer faces, as will be clear from an inspection of Figure 7. Within each housing 48 and keyed to the shafts 45, is an inner sprocket wheel 53 and an outer sprocket wheel 54 of the same size, respectively driving rearwardly extending sprocket chains 55 and 56, preferably of the roller chain type. See also Figure 5.

Figure 5:
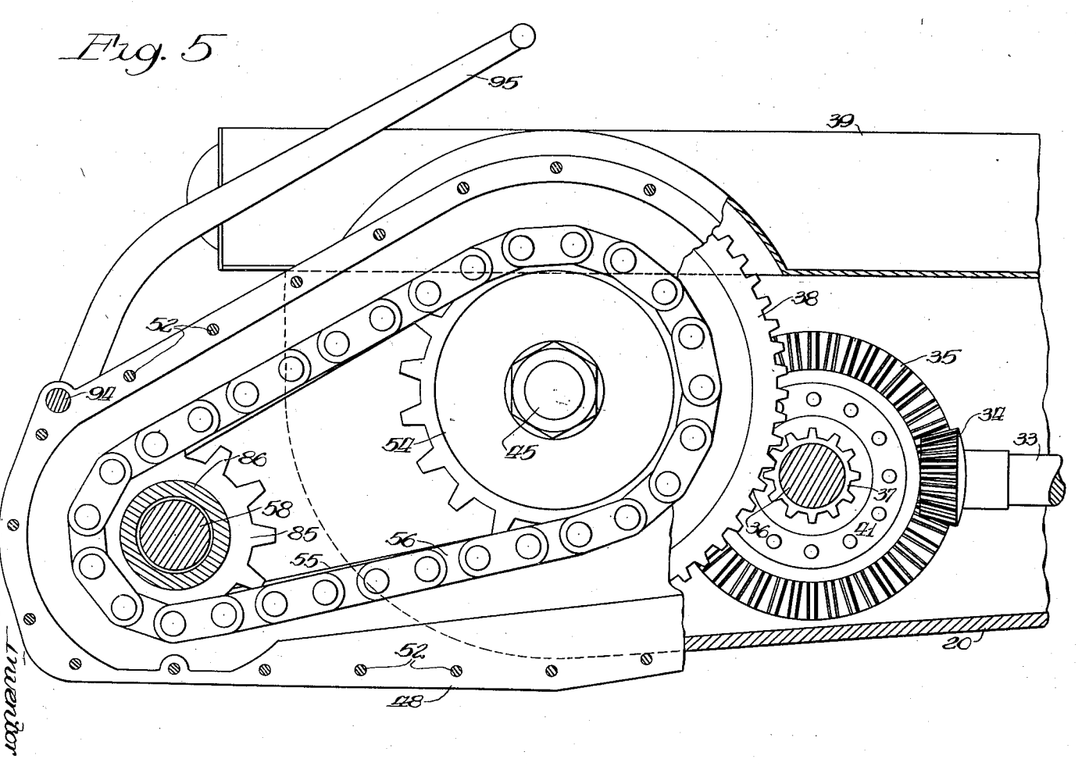
Figure 5 is a side elevational view, partly in section, to illustrate the drive mechanism, taken along the line 5—5 of Figure 2, looking in the direction indicated by the arrows.
Figure 6:
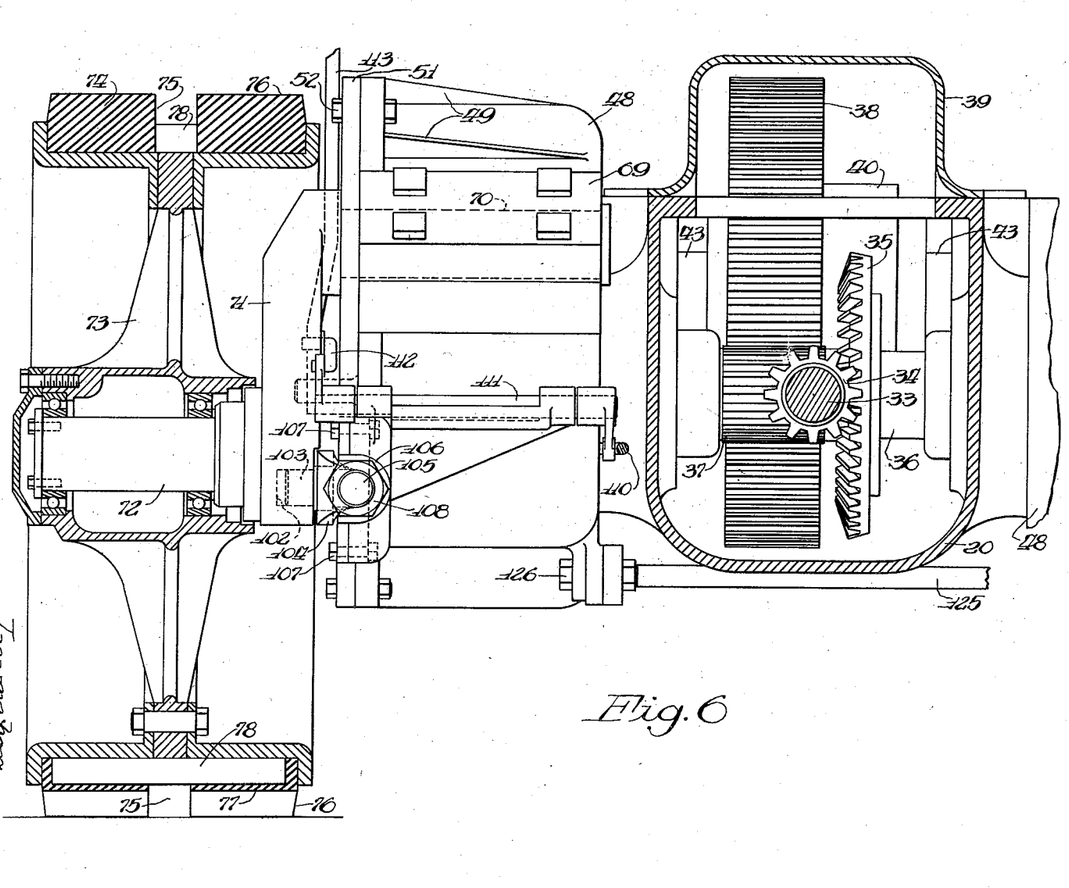
Figure 6 is a transverse view across the tractor and mostly in section, taken along the line 6—6 of Figure 2, looking in the direction of the arrows.
Figure 8:
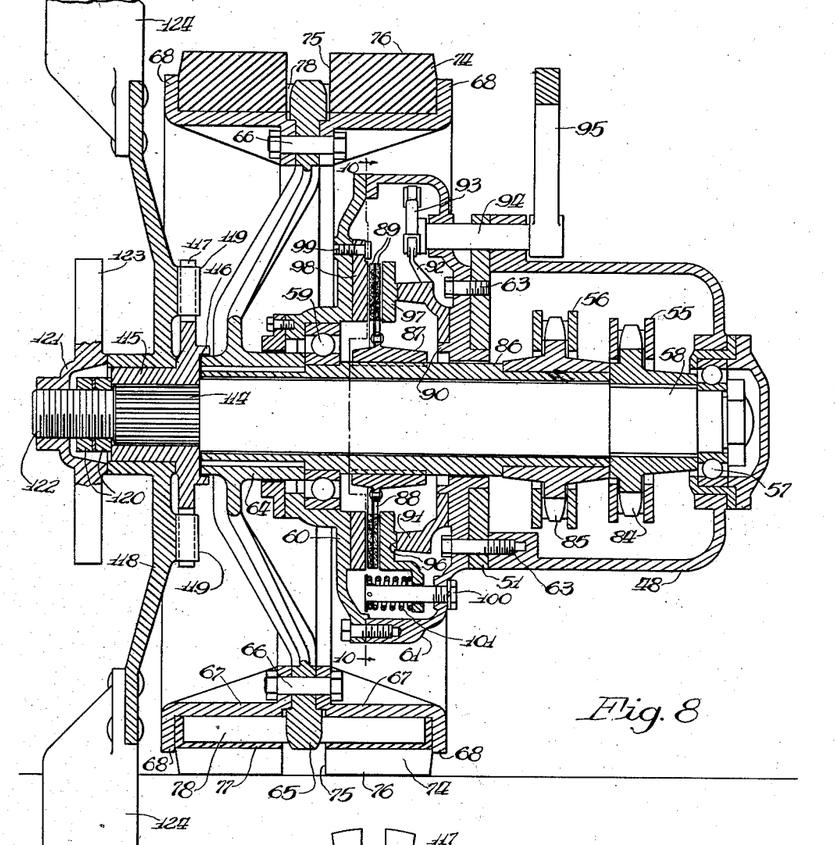
Figure 8 is a transverse sectional view of the final drive mechanism, taken along the line 8—8 of Figure 2, the view additionally showing the special spade lug driving wheel associated with the track.

As shown in Figures 5 and 8, each housing 48, at its rear end, narrows considerably and carries a bearing 57 for journaling the inner end of a transverse stub axle, or final power output shaft 58. There are two such shafts 58, one in each housing 48, and they are in transverse alignment, as is obvious from looking at the drawings. Adjacent the outer end of each shaft 58 is another bearing support 59 carried in a cover plate 60 bolted to the open outer face of a brake housing 61 in turn bolted to the cover plate 51 by bolts 63, some of which also secure these parts to the housing 48, as shown in Figure 8.

The outer portion of the shaft 58 in each housing 48 has splined to it the hub 64 of a track belt driving sprocket wheel 65. Each wheel 65, as shown best in Figure 8, has fastened to it by bolts 66 a pair of complementary rims 67, having inner and outer flanges 68 to provide a flanged wheel rim, as shown, with the sprocket wheel part 65 arranged centrally therein. The rim parts 67 are not continuous, but constitute spaced transverse bars to form a light weight skelton wheel, the flanges 68, however, being continuous.

Figures 3, 4:
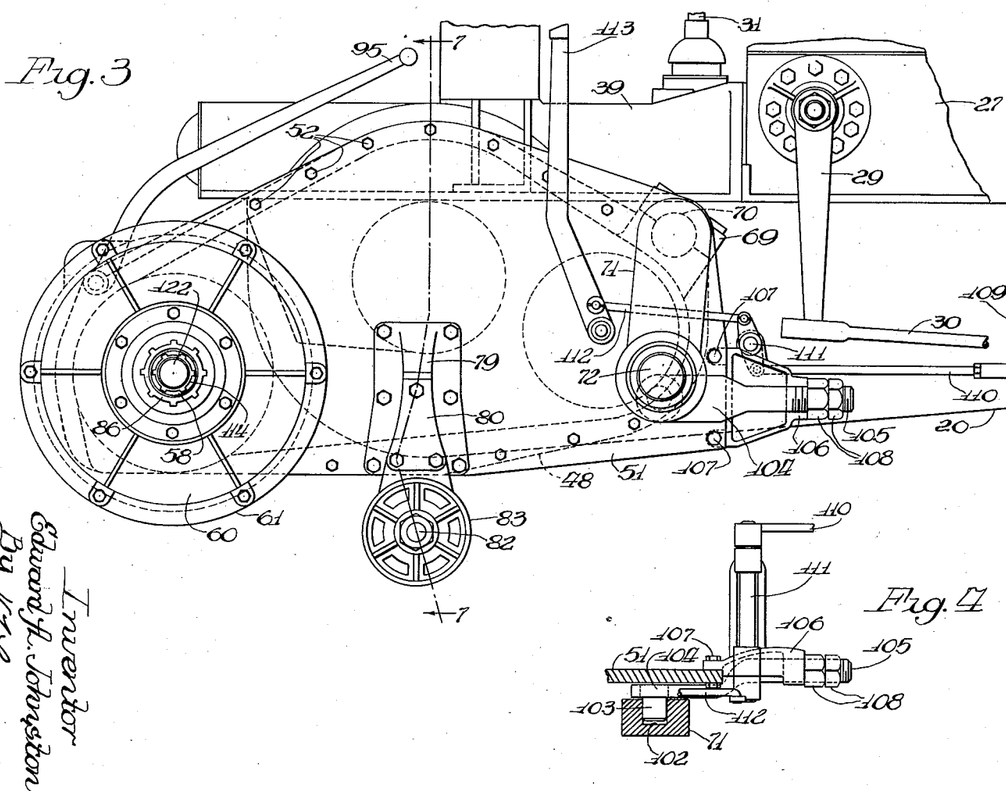
Figure 3 is a side elevational view of the rear end of the tractor, showing a crawler housing unit mounted thereon, the track being removed.
Figure 4 is a detail plan view, partly in section, to illustrate the adjustment means for moving the track idler wheel.

The upper forward part of each housing 48, as shown in Figure 3, carries a split bearing bracket 69 for rockably mounting on each side housing, a crank shaft 70 having a depending web 71 formed at its lower end with an outwardly extending crank shaft 72 on which is rotatably carried a skeletonized flanged idler wheel 73 constructed similarly to the driving wheel 67 heretofore described, with the exception that its rim is blank and not formed with any sprocket teeth.

A rubber track belt 74, divided by a central lengthwise groove 75, envelops endlessly the driving wheel 67 and the idler wheel 73 on each side of the tractor. The belt 74 is formed of spaced, transverse cleat portions 76 to increase the tractive effort of the belt on the ground over which the tractor travels, while alternating with said cleats are dwell portions 77. Embedded in the track at each dwell portion are transverse metal bars 78, against which the sprocket teeth 65 bear in propelling the tracks.

Figure 1:
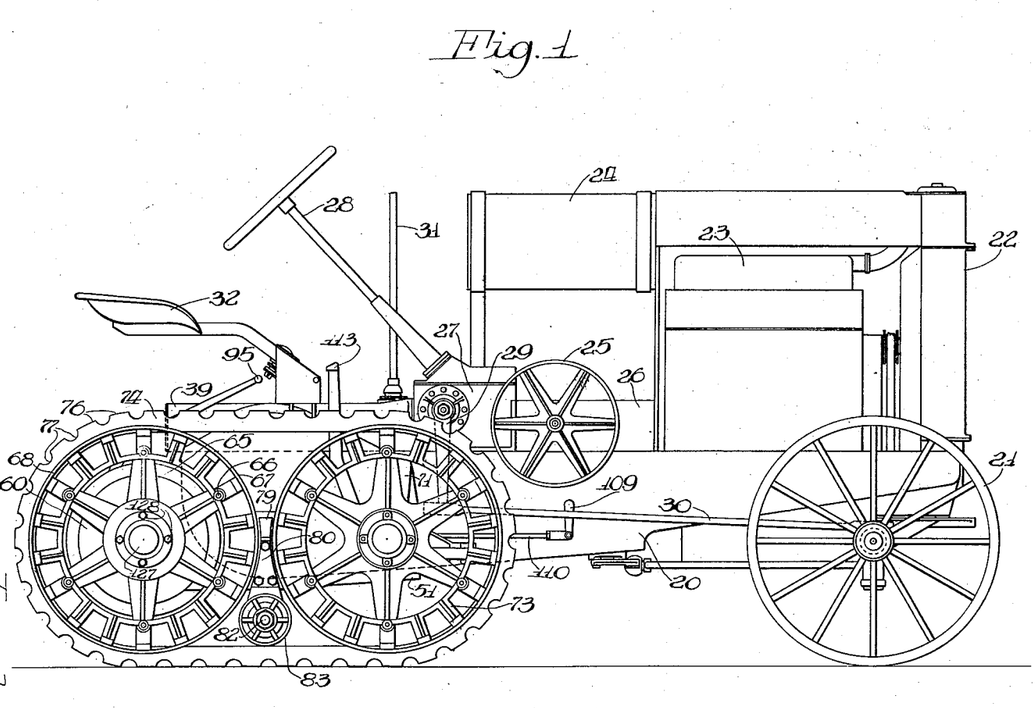
Figure 1 is a general side elevational view of the improved semi-crawler tractor with the special drive wheel attachment for the crawler not shown.

Of course, the weight of the rear end of the tractor is transmitted through the side housings 48 and the wheels 67 and 73 to the belt 74 to hold the latter in ground engagement. Additional means is provided for this purpose between said wheels 67 and 73. Accordingly, each outside cover plate 51, as shown in Figure 7, has bolted to it an outwardly extending hollow bracket 79, to which is secured a depending plate 80. Bolted to said plate are a pair of carriers 81 carrying a transverse shaft 82, on which turn a pair of transversely aligned track rollers 83 bearing upon the intermediate run of the track belt 74, as shown in Figure 1.

The chain 55, heretofore described, drives a small sprocket wheel 84 keyed to the inner end of the shaft 58, while the other chain 56 drives a somewhat larger sprocket wheel 85 keyed to a long sleeve 86 loosely surrounding the shaft 58 for independent rotation relative thereto. The structure now being described is, of course, duplicated on both sides of the tractor and, therefore, only one side, as shown in Figure 8, need be described. From this it can now be seen that the shaft 58 is driven at one speed, whereas the sleeve 86 will be driven at a slower speed, this being due to the difference in sizes of the sprocket wheels 84 and 85.

Figure 10:
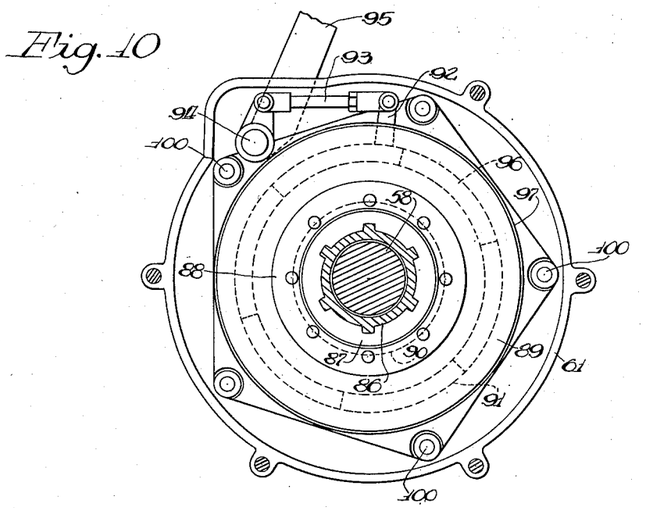
Figure 10 is a sectional view to illustrate a steering control brake, taken along the line 10—10 of Figure 8, looking in the direction of the arrows; and, Figure 11 is a side elevational view of the spade lug wheel, showing its relation to the crawler track and ground level.

The sleeve 86 extends outwardly into the brake housing 61 and has keyed thereto within said housing, a collar 87 carrying a thin clutch brake disk 88 having its opposite sides faced with a friction material lining 89. The housing part 61 carries an integral circular flange 90, on which is turnably mounted, a pressure ring element 91 having at its upper end an integral, upstanding operating arm 92, (see also Figure 10), connected by linkage 93 to a rockshaft 94 journaled as shown in Figure 8, said linkage being operated to rock the shaft 94 by means of a hand lever 95 accessible to the operator on his seat 32. One such clutch brake and lever to operate the same is located at each side of the tractor.

When the shaft 94 is rocked in the proper direction, the ring element turns on the flange 90, said element 91 having cam segments 96 cooperable with complementary wedge surfaces on a pressure plate 97 to press said plate 97 against the friction disk surfaces 89 and tightly against an abutment plate 98 secured by screws 99 to the cap plate 60 heretofore described. The pressure plate 97 is mounted for sliding movement on a number of screw bolts 100 carried by the housing 61, said bolts 100 carrying coil springs 101 effective normally to press the plate 97 out of engagement with clutch brake disk surfaces 89 in a manner readily understood and as shown in Figure 8. Plainly, as the brake just described is out of engagement, the sleeve 86 is driven freely by the chain 56 and sprocket wheel 85 to cause the associated track propelling wheel 65, 67 to turn and drive the associated crawler belt 74.

As has been described, each idler wheel 73 is journaled on a swinging crank arm 71, as shown in Figure 3. This construction permits the idlers to be adjustably set fore and aft to tighten or slacken the track belts 74, as desired. To swing each arm 71, a take-up is provided to adjustably fix the idlers 73 in the proper position. Accordingly, each arm 71, at its lower end, as shown in Figures 3 and 4, has a bore 102 receiving pivotally a stud 103 carried on a link 104 extending forwardly and terminating in a threaded shank 105, which is screw threaded into a bracket 106 secured by bolts 107 to the front edge of the adjacent plate 51. A pair of nuts 108 may be turned on the shank 105 to move the crank arm 71 about its pivot 70 to adjust the idler wheel carried thereby in an obvious manner. Such a belt tightener is provided for each truck idler 73.

The master engine clutch, not here shown, is the same as in my previous patent mentioned and is operated by a crank 109, link 110, rockshaft 111 carried on the bracket 106, link 112, and foot lever 113 located adjacent the operator's seat 32.

Figure 9:
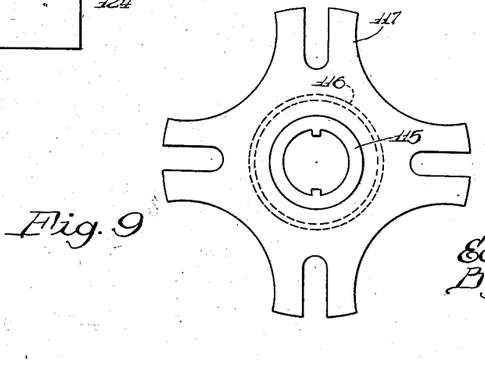
Figure 9 is a detail face view of a part utilized in connecting the spade lug drive wheel to the track mechanism.
Figure 11:
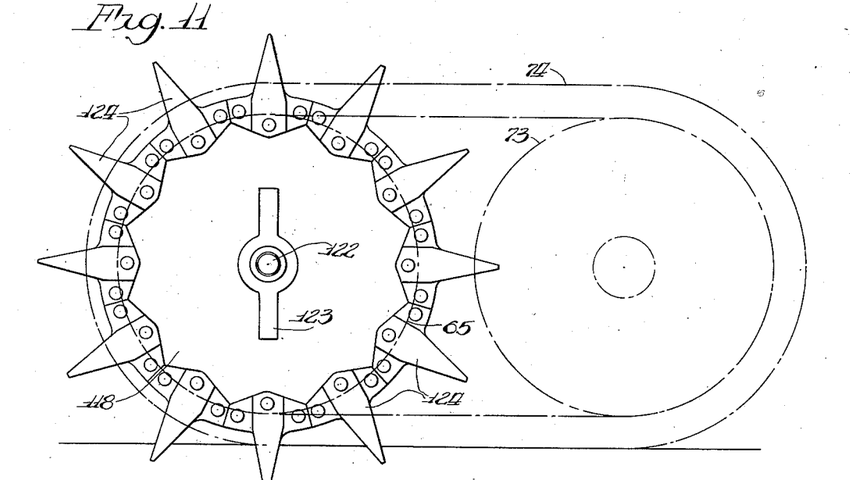

An auxiliary traction increasing spade lug wheel attachment may be associated with each track belt 74 coaxially with each sprocket drive wheel 65, 67, as will now be described. As shown in Figure 8, the outer end of each stub axle 58 is reduced, as at 114, said extension carrying a splined hub 115 having a flange 116 telescopically fitting over the hub 64, as shown, said hub 115 including a number of radially extending notched spider arms 117. Slid onto the hub 115 is a disk wheel 118, also shown in Figure 11, said wheel having on its inside face a number of integrally formed lugs 119 to slip into the respective spider arms 117 formed, as shown in Figure 9, to establish a sturdy and positive drive connection between the hub 115 and the wheel 118. A pair of nuts 120 hold the hub 115 on the axle extension 114 and a large nut cap member 121 threads onto a threaded extension 122 of the axle part 114 to hold the wheel 118 in place, said cap 121 having radial arms 123 to enable a person easily to turn and unturn the cap 121 relative to the extension 122. The periphery of the wheel 118 has riveted or otherwise secured thereto a plurality of radially extending traction increasing spade lugs 124, which extend radially outwardly a substantial distance beyond the circumference of the adjacent wheel 67.

A drawbar 125 is provided, the same being U-shaped, with its bight to the rear and its opposite legs extending forwardly alongside the inner walls of the housings 48 and being connected thereto by bolts 126 in any suitable manner.

The operation of the tractor will now be described. The motor 23 drives the usual change speed gear set, not shown, to turn the gear 34, causing rotation of the gear 35, counter-shaft 36, and pinion 37, the latter in turn driving the bull gear 38 and differential housing 40. This drives the two aligned differential jack shafts 45 through the differential gearing 46, thereby driving the sprocket wheels 53, 54 on each side and contained in the housings 48. This drives the respective chains 55 and 56 to drive the aligned stub axles 58 and the sleeves 86. The brakes 88 are normally disengaged and, as a consequence, the sprockets 84 drive the associated stub axles 58 at one speed, and the sprockets 85 drive the associated sleeves 86 at a somewhat slower speed. The reduction is such that the linear peripheral speeds of the track propelling wheel 67 and the spade lug wheel 124 in each drive traction unit will be the same. By this is meant that the linear speed of travel of the two wheels 67, 124 is the same although the large wheel 124 is angularly driven faster than its adjacent small wheel 67. Slippage of the large wheel 124 compensates for the slower angular speed of the smaller wheel 57. This drive reduction thus compensates, in certain conditions presently to be described, for the different sizes of the track propelling wheels 67 and the spade lug wheels 124. The tractor thus moves straight ahead with the spade wheels 124 assuring good traction, even if the belts 74 slip.

It would appear off-hand that the shaft 58 should rotate at a slower speed than the sleeve 86 because the diameter of the spade wheel 118 is greater than the diameter of the sprocket wheel 67, to make the two wheels operate normally at the same peripheral speeds. However, in the particular example herein illustrated the structure is not so designed because the sprocket wheel 84 that drives the shaft 58 is smaller than the sprocket wheel that drives the sleeve 86, whereupon the shaft turns slightly faster than the sleeve, as has been described. The reason for this is that, when both the crawler and spade wheel are used, it is because soft and muddy ground conditions are present; and under such conditions the endless track, having a large ground contact area, does not slip very much relatively and the same is, of course, also true of the associated drive sprocket wheel. On the other hand, the spade wheel does not have nearly as much traction advantage and tends to slip relatively a great deal more than does the track. Accordingly, it is desirable to rotate the spade wheel 118 slightly faster than the track drive sprocket wheel 67 even though the former is of larger diameter than the latter.

Steering control is effected by applying the brakes 88 to lock one or the other of the differential shafts 45 against rotation. For instance, as viewed by an operator from his seat 32, if a turn to the right is desired, the right hand steering control lever 95 is depressed by hand to apply the associated brake 88. This locks the right hand sleeve 86 against rotation and all parts geared thereto, such as the sprocket wheel 85, chain 56, sprocket wheel 54, and the right hand differential drive shaft 45. The engine power, therefore, is differentially distributed to the left hand shaft 45 only, causing the left hand track 74 to continue in operation while the right hand track is held stationary. Consequently, a right hand turn of the tractor obviously results. The right hand spade wheel 124 also is locked, because, when the right hand shaft 45 stops turning, the drive parts 53, 55 and 84 also stop, as will be obvious. As is common in tractors of this type, the operator may slip the applied brake to vary the sharpness of the turning action, as desired. A turn to the left is achieved in the same manner, but by applying the left hand brake.

Of course, steering is aided by the control 28 used to angle the front wheel supports 21 in a manner well known in operating these semi-crawler types of tractors.

If it is desired to operate the tractor without the traction wheel attachments 118, the latter may be easily removed and a cap, shown in full lines in Figures 1 and 2, is placed over the hub 64 after the parts 123, 118, 117 have been removed. The cap is numbered 127 and it is held in place by cap screws 128 secured in the hub 64, as shown.

These crawler traction attachments are intended as substitutes for the usual traction wheels of this type tractor, which, as has previously been said, is shown in my previous Patent No. 1,559,617. The conversion is accomplished by jacking up the rear end of the wheel tractor, removing the traction wheels and differential shafts carrying the same, then assembling to the side of the tractor body, in the manner heretofore described, the housings and operative parts comprising the crawler attachments.

The spade wheels 124 afford additional traction and are mainly useful in plowing when one track runs in the furrow and the other track runs on the land. In such condition of use, the tractor is tilted and the tracks may not flatly engage the ground. As the spade wheels are of a larger diameter, they compensate for such lack of traction by projecting beyond the track to make a good traction grip with the ground and thus prevent slippage of the tracks.

It is the intention to cover all such changes and modifications which do not depart from the spirit and scope of the invention as indicated by the definitions thereof comprising the appended claims.

What is claimed is:

1. A tractor having a longitudinal body carrying a motor, crawler devices supporting opposite sides of the rear end of the body comprising elongated housings connected to the body, an axle structure comprising a shaft and sleeve extending transversely outwardly from each housing and the sleeve carrying outside the housings a track propelling wheel, a pair of transverse differential shafts respectively extending inwardly from each housing into the body, a differential in said body driven from the motor and with which the latter pair of shafts at their inner ends have operative connections, the axle shafts each carrying a traction wheel outside the track propelling wheel of greater diameter than the latter, dual drive connections in each housing for driving the corresponding axle shaft and sleeve from a differential shaft to cause the propelling and traction wheels to be driven, an idler wheel carried by the forward portion of each housing, and a track belt enveloping the track propelling and idler wheels on each side of the tractor.

2. A tractor having a longitudinal body carrying a motor, crawler devices supporting opposite sides of the rear end of the body comprising elongated housings connected intermediate their ends to the body, an axle structure comprising a coaxial shaft and a sleeve surrounding same with both extending transversely outwardly from each housing adjacent its rear end and the sleeve in each axle structure carrying outside the housing a track propelling wheel, a pair of transverse differential shafts disposed respectively intermediate the ends of each housing and respectively extending inwardly from each housing into the body, a differential in said body driven from the motor and with which the latter two shafts at their inner ends have operative connections, the axle shafts each carrying for rotation therewith respectively a traction wheel outside and adjacent a track propelling wheel and said traction wheels being of greater diameter than the track propelling wheels, dual drive connections in each housing between the axle, the sleeve, and corresponding differential shaft to cause the propelling and traction wheels on one side to be driven together but at different angular speeds with the traction wheels turning faster than the propelling wheels, an idler wheel carried by the forward portion of each housing in longitudinal alignment with each track propelling wheel on that side of the tractor, a track belt enveloping the track propelling and idler wheels on each side of the tractor, and steering control means in each housing associated with the sleeve therein.

3. A tractor having a longitudinal body carrying a motor, crawler devices supporting opposite sides of the rear end of the body comprising elongated housings connected to the body, an axle shaft extending transversely outwardly from each housing and each including a sleeve, the sleeve carrying outside the housing a track propelling wheel, transverse differential shafts respectively extending inwardly from each housing into the body, a differential in said body driven from the motor and with which the differential shafts have operative connection, the axle shafts each carrying a traction wheel outside the track propelling wheel of greater diameter than the latter, dual drive connections in each housing between the axle, the sleeve, and a corresponding differential shaft to cause the propelling and traction wheels to be driven, an idler wheel carried by the forward portion of each housing, a track belt enveloping the track propelling and idler wheels on each side of the tractor, a brake operatively associated with each sleeve and located within the respective housings, said brakes being normally disengaged, and means to apply the brakes independently for steering the tractor.

4. A tractor having a longitudinal body carrying a motor, crawler devices supporting opposite sides of the rear end of the body comprising elongated housings connected to the body, an axle shaft extending transversely outwardly from each housing and each including a coaxial sleeve surrounding same, said sleeves respectively carrying outside the housings track propelling wheels, transverse differential shafts respectively extending inwardly from each housing into the body, a differential in said body driven from the motor and with which the differential shafts have operative connection, the axle shafts each carrying a traction wheel outside and respectively adjacent a track propelling wheel and of greater diameter than the latter, dual drive connections in each housing between the axle and sleeve and a corresponding differential shaft to cause the propelling and traction wheels of each pair to drive at the same time but at different angular speeds with the traction wheels turning faster than the propelling wheels, an idler wheel carried by the forward portion of each housing, a track belt enveloping the track propelling and idler wheels on each side of the tractor, a brake operatively associated with each sleeve and normally held disengaged, and means to apply the brake to lock the sleeve and connected parts to discontinue the drive to either track and associated traction wheel.

5. A tractor having a longitudinal body carrying a motor, crawler devices supporting opposite sides of the rear end of the body comprising elongated housings connected to the body, a traction drive unit at each side of the body comprising an axle extending from each housing and carrying a traction wheel, differential shafts extending respectively from each housing into the body, a differential in said body driven from the motor and with which the differential shafts have operative connection, the axles each carrying a coaxial sleeve for mounting a track propelling wheel inwardly of the traction wheel, the traction wheel in each unit being of greater diameter than the adjacent track propelling wheel, drive connections in each housing between the axle, the sleeve, and a corresponding differential shaft to cause the propelling and traction wheels to drive at different angular speeds with the traction wheels turning faster than the propelling wheels, an idler wheel carried by each housing, and a track belt enveloping the track propelling and idler wheels on each side of the tractor.

6. A tractor having a longitudinal body carrying a motor, crawler devices supporting opposite sides of the rear end of the body comprising housings connected to the body, an axle extending from each housing and carrying a traction wheel, a differential shaft extending from each housing into the body, a differential in the body driven from the motor and with which the differential shafts have operative connection, a sleeve on the axle in each housing, a track propelling wheel carried on each sleeve adjacent the traction wheel, driving connections between the sleeve and the corresponding differential shaft and between the axle and the corresponding differential shaft in each housing to drive the traction and propelling wheels, a normally released brake on the sleeve in each housing, means for applying either brake to stop the rotation of the sleeve and associated track propelling wheel, an idler wheel carried by each housing, and a track belt enveloping the respective track propelling and idler wheels on each housing.

7. The combination of a tractor having a crawler unit embodying a shaft carrying and driving a traction wheel, a sleeve about the shaft carrying and driving a track propelling wheel mounted adjacent the traction wheel, a track belt enveloping the track propelling wheel, said wheels being of different diameters, and means associated with the sleeve and shaft to drive both of said wheels simultaneously but at different angular speeds with the traction wheel turning faster than the propelling wheel.

8. The combination of a tractor having a crawler unit embodying a shaft carrying and driving a spade lug traction wheel, a sleeve about the shaft carrying and driving a track propelling wheel mounted adjacent and coaxially of the aforementioned wheel, said wheels being of different diameters, a track belt around the track propelling wheel, and means to drive the sleeve and shaft simultaneously to cause different angular speeds of rotation for the wheels with the traction wheel turning faster than the propelling wheel.

9. The combination of a tractor having a crawler unit embodying a shaft carrying and driving a traction increasing wheel, a sleeve about the shaft carrying and driving a track propelling wheel mounted adjacent and coaxially with the aforementioned wheel, said wheels being of different diameters, a track belt enveloping the track propelling wheel, means operatively associated with the shaft and sleeve to drive one wheel at one angular speed and the other wheel at a different angular speed with the traction increasing wheel turning faster than the track propelling wheel, and means for detachably connecting the traction increasing wheel to the shaft in co-operative relationship to and alongside the track propelling wheel.

10. The combination of a tractor having a crawler unit embodying a shaft carrying and driving a traction increasing wheel, a sleeve about the shaft carrying and driving a track propelling wheel mounted adjacent and coaxially with the aforementioned wheel, said wheels being of different diameters, a track belt enveloping the track propelling wheel, means operatively associated with the shaft and sleeve to drive one wheel at one angular speed and the other wheel at a different angular speed with the traction increasing wheel turning faster than the track propelling wheel, and a hub including spider arms splined on the shaft, said traction increasing wheel having means to engage said spider arms for drivingly and detachably associating the said wheel with the shaft and track propelling wheel.

11. The combination in a semicrawler tractor having a longitudinal body supported at its front end on a steerable wheel truck, the rear end of the body on opposite sides being carried on crawler units each of which embodies a housing connected to the adjacent side of the body, said body carrying a final drive mechanism including shafts respectively extending into the housings, each housing carrying a coaxial shaft and sleeve structure extending outwardly therefrom in spaced relation with and parallel to the final drive mechanism shaft therein, driving connections from the final drive shafts to rotate the coaxial shaft and sleeve structure in each housing, a track driving sprocket wheel and an auxiliary traction increasing wheel carried by and driven respectively from the coaxial shaft and sleeve structure, said wheels being located outside the housing, each housing carrying a guide wheel, and an endless track belt enveloping the sprocket and guide wheel on each side of the tractor, and means for independently regulating the supply of power to each track sprocket wheel and belt for assisting steering movements of the tractor.

12. The combination in a semicrawler tractor having a longitudinal body supported at its front end on a steerable wheel truck, the rear end of the body on opposite sides being carried on crawler units each of which embodies a housing connected to the adjacent side of the body, said body carrying a final drive mechanism including differential shafts respectively extending into the housings, each housing carrying a coaxial shaft and sleeve extending outwardly therefrom in spaced relation with and parallel to the final drive mechanism shaft therein, driving connections from the final drive shafts to rotate the coaxial shaft and sleeve in each housing, a track driving sprocket wheel carried by the sleeve and an auxiliary traction increasing wheel carried by the coaxial shaft, said wheels being located outside the housing, each housing carrying a guide wheel, an endless track belt enveloping the sprocket and guide wheel on each side of the tractor, and a brake in each housing for independently regulating the supply of power to each track sprocket wheel and belt for assisting steering movements of the tractor.

13. The combination in a semicrawler tractor having a longitudinal body supported at its front end on a steerable wheel truck, the rear end of the body on opposite sides being carried on crawler units each of which embodies a housing connected to the adjacent side of the body, said body carrying a final drive mechanism including differential shafts respectively extending into the housings, each housing carrying a coaxial shaft and sleeve extending outwardly therefrom in spaced relation with and parallel to the final drive mechanism shaft therein, driving connections from the final drive shafts to rotate the coaxial shaft and sleeve together in each housing, a track driving sprocket wheel carried on the sleeve and an auxiliary traction increasing wheel carried on the coaxial shaft, said wheels being located outside the housing, each housing carrying a guide wheel, an endless track belt enveloping the sprocket and guide wheel on each side of the tractor, and brake means operatively associated with the sleeve in each housing for independently regulating the supply of power to each track sprocket wheel and belt for assisting steering movements of the tractor.

14. The combination in a semicrawler tractor having a longitudinal body supported at its front end on a steerable wheel truck, the rear end of the body on opposite sides being carried on crawler units each of which embodies a housing connected to the adjacent side of the body, said body carrying a final drive mechanism including differential shafts respectively extending into the housings, each housing carrying a coaxial shaft and sleeve structure extending outwardly therefrom in spaced relation with and parallel to the final drive mechanism shaft therein, driving connections from the final drive differential shafts to rotate the coaxial shaft and sleeve structure together in each housing, a track driving sprocket wheel and an auxiliary traction increasing wheel carried by and driven respectively from the coaxial sleeve and shaft structure, said wheels being located outside the housing, each housing carrying a guide wheel, an endless track belt enveloping the sprocket and guide wheel on each side of the tractor, and operator controlled friction means for independently regulating the supply of power to each track sprocket wheel for assisting steering movements of the tractor.

15. A steering and traction unit for a crawler tractor having a body, said unit embodying a transverse shaft extending from the body and carrying at its free outer end for rotation therewith an auxiliary traction wheel of one diameter, a sleeve journaled in the body and disposed concentrically around the shaft, said sleeve extending outwardly to a point adjacent the traction wheel, a track propelling wheel of a diameter different from the diameter of the traction wheel and carried on the outer end of the sleeve adjacent the traction wheel for rotation with the sleeve, an endless track included in the unit carried and driven by said track propelling wheel, driving means for turning the shaft and sleeve independently at different speeds whereby to turn the traction wheel at a different angular speed than the track propelling wheel with the traction wheel turning faster than the track propelling wheel, and means included in the unit for slipping and braking the wheels to control steering movement of the tractor.

16. The combination in a tractor having a crawler unit embodying a longitudinal side housing having spaced inner and outer walls with the inner wall carrying a bearing, a transverse shaft journaled at its inner end in said bearing, the outer end of the shaft projecting through the outer wall and carrying outwardly of the housing a traction wheel, a sleeve carried coaxially on the shaft and journaled in a bearing carried in the outer wall, said sleeve projecting outwardly of the outer wall and carrying a drive sprocket wheel for an endless track band, the traction and sprocket wheels being disposed side by side, a brake disk having a hub slidably keyed on the sleeve, means carried in the housing to press the disk against a stationary part included in the housing to brake the sleeve and sprocket wheel, a drive wheel carried on the sleeve, a drive wheel carried on the shaft, and means in said housing for driving the shaft and sleeve through said drive wheels to drive the traction and sprocket wheels.

17. The combination in a tractor having a crawler unit embodying a longitudinal side housing having inner and outer walls with the inner wall carrying a bearing, a transverse shaft journaled at its inner end in said bearing, the outer end of the shaft projecting through the outer wall and carrying outwardly of the housing a traction wheel, a sleeve carried coaxially on the shaft and journaled in a bearing carried in the outer wall, said sleeve projecting outwardly of the outer wall and carrying a drive sprocket wheel for an endless track band, the traction and sprocket wheels being disposed side by side, a brake disk having a hub slidably keyed on the sleeve, means carried in the housing to press the disk from a normal inoperative position to an operative position against a stationary part included in the housing to brake the sleeve and sprocket wheel, a drive wheel of one size carried on the sleeve, a drive wheel of another size carried on the shaft, and means in said housing for driving the shaft and sleeve through said drive wheels to drive the traction and sprocket wheels simultaneously at different angular speeds.

18. The combination in a tractor having a crawler unit embodying a longitudinal side housing having inner and outer walls with the inner wall carrying a bearing, a transverse shaft journaled at its inner end in said bearing, the outer end of the shaft projecting through the outer wall and carrying outwardly of the housing a traction wheel, a sleeve carried coaxially on the shaft and journaled in a bearing carried in the outer wall, said sleeve projecting outwardly of the outer wall and carrying a drive sprocket wheel for an endless track band, the traction and sprocket wheels being disposed side by side with the traction wheel being of greater diameter than the sprocket wheel, a normally inoperative movable brake associated with the sleeve, means carried in the housing to move the brake against a stationary part included in the housing to brake the sleeve and sprocket wheel, a drive wheel carried on the sleeve, a relatively smaller drive wheel carried on the shaft, and means in said housing for driving the shaft and sleeve through said drive wheels, whereby the traction wheel has a greater angular speed than the sprocket wheel.

19. The combination in a tractor having a crawler unit embodying a longitudinal side housing having inner and outer walls with the inner wall carrying a bearing, a transverse shaft journaled at its inner end in said bearing, the outer end of the shaft projecting through the outer wall and carrying outwardly of the housing a traction wheel, a sleeve carried coaxially on the shaft and journaled in a bearing carried in the outer wall, said sleeve projecting outwardly of the outer wall and carrying a drive sprocket wheel for an endless track band, a movably mounted brake carried on the sleeve, means carried in the housing to move the brake from an inoperative to an operative position against a stationary part included in the housing to brake the sleeve and sprocket wheel, a drive sprocket wheel carried on the sleeve, a drive sprocket wheel carried on the shaft, and means in said housing including separate drive chains for driving the shaft and sleeve through said drive sprocket wheels.

20. The combination in a tractor having a crawler unit embodying a longitudinal side housing having inner and outer walls with the inner wall carrying a bearing, a transverse shaft journaled at its inner end in said bearing, the outer end of the shaft projecting through the outer wall and carrying outwardly of the housing a hub provided with radial spiders, a traction wheel carried removably on the hub and including means to receive the spiders so that the hub turns the wheel, a sleeve carried coaxially on the shaft and journaled in a bearing carried in the outer wall, said sleeve projecting outwardly of the outer wall and carrying a drive sprocket wheel for an endless track band, a brake disk having a hub slidably keyed on the sleeve, means carried in the housing to press the disk against a stationary part included in the housing to brake the sleeve and sprocket wheel, and drive means in the housing for conjointly driving the shaft and sleeve to turn the traction and sprocket wheels.

EDWARD A. JOHNSTON.